(12) United States Patent
Woodard et al.

(10) Patent No.: US 7,047,807 B2
(45) Date of Patent: May 23, 2006

(54) FLEXIBLE FRAMEWORK FOR CAPACITIVE SENSING

(75) Inventors: Stanley E. Woodard, Hampton, VA (US); Bryant D. Taylor, Smithfield, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/203,583

(22) Filed: Aug. 8, 2005

(65) Prior Publication Data

US 2006/0053899 A1 Mar. 16, 2006

Related U.S. Application Data

(60) Provisional application No. 60/609,510, filed on Sep. 13, 2004.

(51) Int. Cl.
*G01F 23/26* (2006.01)
*G01R 27/26* (2006.01)

(52) U.S. Cl. .................................. 73/304 C; 324/690
(58) Field of Classification Search .............. 73/304 C; 324/690
See application file for complete search history.

(56) References Cited

U.S. PATENT DOCUMENTS

| 3,343,415 | A | | 9/1967 | Johnston et al. |
|---|---|---|---|---|
| 3,474,337 | A | * | 10/1969 | Petrick .................. 324/644 |
| 4,122,718 | A | | 10/1978 | Gustafson |
| 4,553,434 | A | | 11/1985 | Spaargaren |
| 5,001,596 | A | | 3/1991 | Hart |
| 5,103,368 | A | | 4/1992 | Hart |
| 5,437,184 | A | | 8/1995 | Shillady |
| 6,186,001 | B1 | * | 2/2001 | Baker ...................... 73/304 C |
| 6,269,693 | B1 | * | 8/2001 | Irion ........................ 73/304 C |
| 6,293,142 | B1 | | 9/2001 | Pchelnikov et al. |
| 6,335,690 | B1 | | 1/2002 | Konchin et al. |
| 6,539,797 | B1 | | 4/2003 | Livingston et al. |
| 6,564,658 | B1 | | 5/2003 | Pchelnikov et al. |
| 6,677,859 | B1 | | 1/2004 | Bensen |
| 6,802,205 | B1 | | 10/2004 | Barguirdjian et al. |
| 6,823,730 | B1 | | 11/2004 | Buck et al. |
| 2001/0037680 | A1 | | 11/2001 | Buck et al. |
| 2003/0000303 | A1 | | 1/2003 | Livingston et al. |
| 2003/0019291 | A1 | | 1/2003 | Pchelnikov et al. |
| 2004/0004545 | A1 | | 1/2004 | Early |
| 2004/0004550 | A1 | | 1/2004 | Early |
| 2004/0004551 | A1 | | 1/2004 | Early |
| 2004/0078014 | A1 | | 4/2004 | Shapira |
| 2005/0007239 | A1 | | 1/2005 | Woodard et al. |

* cited by examiner

*Primary Examiner*—Evan Pert
(74) *Attorney, Agent, or Firm*—Robin W. Edwards

(57) ABSTRACT

A flexible framework supports electrically-conductive elements in a capacitive sensing arrangement. Identical frames are arranged end-to-end with adjacent frames being capable of rotational movement therebetween. Each frame has first and second passages extending therethrough and parallel to one another. Each of the first and second passages is adapted to receive an electrically-conductive element therethrough. Each frame further has a hollowed-out portion for the passage of a fluent material therethrough. The hollowed-out portion is sized and shaped to provide for capacitive sensing along a defined region between the electrically-conductive element in the first passage and the electrically-conductive element in the second passage.

19 Claims, 3 Drawing Sheets

FLEXIBLE FRAMEWORK FOR CAPACITIVE SENSING

ORIGIN OF THE INVENTION

The invention was made in part by an employee of the United States Government and may be manufactured and used by or for the Government of the United States of America for governmental purposes without the payment of any royalties thereon or therefor.

Pursuant to 35 U.S.C. § 119, the benefit of priority from provisional application 60/609,510, with a filing date of Sep. 13, 2004, is claimed for this non-provisional application.

BACKGROUND OF THE INVENTION

1. Field of the Invention

This invention relates to sensor supports. More specifically, the invention is a flexible framework for capacitive sensing arrangements used in a magnetic field response sensing system.

2. Description of the Related Art

Capacitive sensors for measuring and detecting fluid levels are known in the art. For example, U.S. Pat. No. 4,122,718, discloses a flexible capacitive sensor in which spaced-apart wires are encased along their lengths by a fluoroplastic that also forms a web between the wires. While this sensor is flexible, it still may be difficult to get the sensors to conform to a tortuous or serpentine path that requires the sensor to be inserted in one end of the path and flex in different directions to conform to the path's shape. Further, since the path itself would be used to shape the sensor as it was pushed in from one end of the path, the sensor could develop kinks or "bunch up" along its length thereby limiting the sensor's effectiveness. Still further, the web of fluoroplastic material between the wires can affect the sensor's sensitivity.

SUMMARY OF THE INVENTION

Accordingly, it is an object of the present invention to provide a flexible framework that can support electrically-conductive elements in a capacitive sensing arrangement.

Another object of the present invention is to provide a flexible capacitive sensing arrangement.

Other objects and advantages of the present invention will become more obvious hereinafter in the specification and drawings.

In accordance with the present invention, a flexible framework is provided and can be used to support electrically-conductive elements in a capacitive sensing arrangement. The framework is made from a plurality of identical frames arranged end-to-end with adjacent frames capable of rotational movement therebetween about an axis that is common thereto. Each frame has first and second passages extending therethrough and parallel to one another. The first passages associated with the end-to-end arrangement of frames are aligned end-to-end. Likewise, the second passages associated with the end-to-end arrangement of frames are aligned end-to-end. Each of the first and second passages is adapted to receive an electrically-conductive element therethrough. Each frame further has a hollowed-out portion adapted to allow the passage of a fluent dielectric material therethrough. The hollowed-out portion is sized and shaped to provide for capacitive sensing along a defined region between the electrically-conductive element in the first passage and the electrically-conductive element in the second passage.

DETAILED DESCRIPTION OF THE INVENTION

The present invention is a flexible framework that can support electrically-conductive elements in a capacitive sensing arrangement. Accordingly, with the electrically-conductive elements supported in the flexible framework, a flexible capacitive sensing arrangement is formed. The sensing arrangement can be used as part of a fluid level sensing system when used in conjunction with a magnetic field response measurement acquisition system such as that disclosed in U.S. patent application Ser. No. 2005/0007239, the contents of which are hereby incorporated by reference. As examples, the electrically conductive elements can be connected to an inductor to form a magnetic field response sensor or connected to a data acquisition system.

Figure 1:
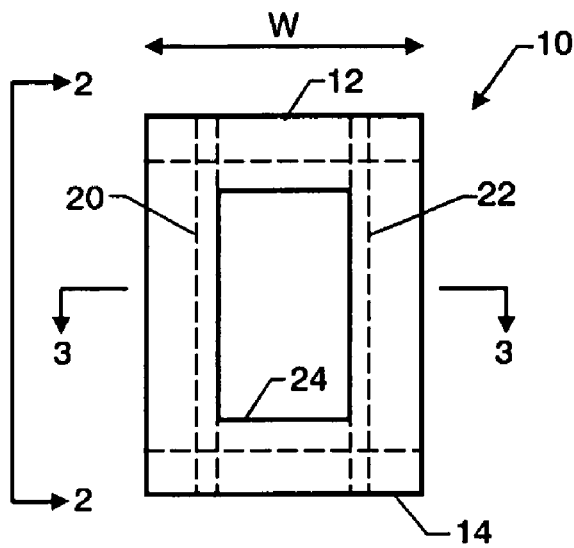
FIG. 1 is a plan view of an embodiment of a single frame element used in the flexible framework of the present invention.
Figure 2:
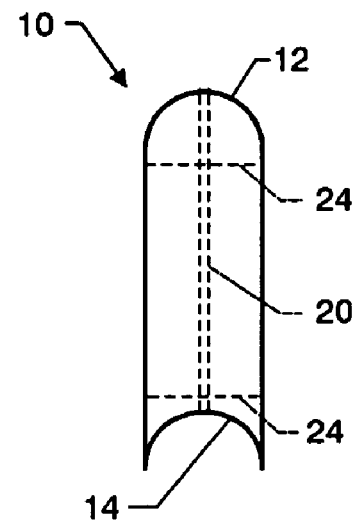
FIG. 2 is a side view of the frame element taken along line 2—2 of FIG. 1.
Figure 3:
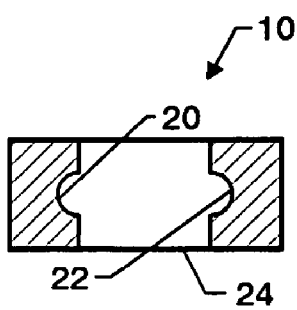
FIG. 3 is a cross-sectional view of the frame element taken along line 3—3 of FIG. 1.

At the heart of the present invention's flexible framework (and sensing arrangement using the framework) is a unique frame element. Referring now to the drawings, and more particularly to FIGS. 1–3, an embodiment of the frame element is illustrated and is referenced generally by numeral 10. As will be explained further below, a plurality of frame elements 10 are arranged end-to-end to form a flexible framework. Since each frame element 10 is identical, it is sufficient to describe one herein.

Referring to FIGS. 1–3 simultaneously, frame element 10 is typically (but need not be) a one-piece element having a convexly-shaped end 12 and a corresponding concavely-shaped end 14. Frame element 10 is generally made from an electrically non-conductive material and one that is inert with respect to an application's environment. Convexly-shaped end 12 and concavely-shaped end 14 extend along the same dimension (e.g., width W) of frame element 10.

Figure 4:
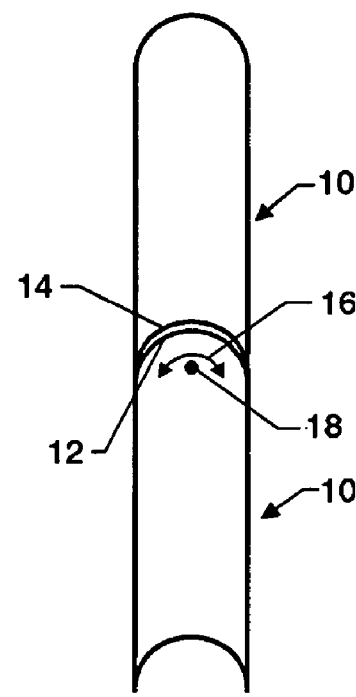
FIG. 4 is a side view of two frame elements arranged end-to-end.

The amount of convexity/concavity of ends 12/14 is not a limitation of the present invention. However, in general, the size/shape of ends 12/14 should be such that when two of frame elements 10 are arranged end-to-end as shown in FIG. 4, convexly-shaped end 12 of one frame element should nest within concavely-shaped end 14 of the adjacent frame element 10. Accordingly, adjacent frame elements 10 will be able to experience rotational movement (indicated by two-headed arrow 16) about an axis 18 that is common to the nested arrangement of adjacent ends 12/14. Axis 18 extends along the dimension (e.g., width W) along which ends 12 and 14 are formed.

Referring still to FIGS. 1–3, frame element 10 defines first and second passages 20 and 22, respectively, that run from end 12 to end 14. Typically, passages 20 and 22 are parallel to one another all along their lengths. An opening or hollowed-out portion (illustrated by the rectangle referenced by numeral 24 in FIG. 1) is formed through frame element 10. In the illustrated embodiment, passages 20 and 22 open to opening 24 along the length thereof as best seen in FIG. 3 such that passages 20 and 22 define a "C-shape" along opening 24. Accordingly, when frame element 10 is immersed in a fluent dielectric material (e.g., liquid, sludge, powder, gas, etc.), the fluent dielectric material can pass through opening 24 and enter passages 20 and 22 therealong.

Figure 5:
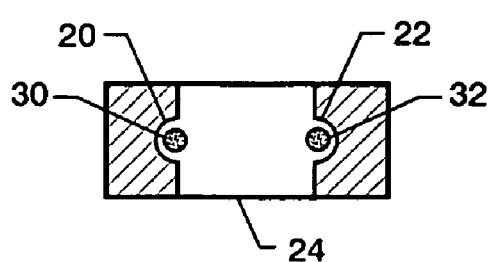
FIG. 5 is a cross-sectional view of the frame element taken along line 3—3 of FIG. 1 with electrically-conductive elements in each of the frame element's passages.

Each of passages 20 and 22 is sized/shaped along their length to receive an electrically-conductive element such as a wire as illustrated in FIG. 5. Specifically, a first wire 30 extends through passage 20 and a second wire 32 extends through passage 22. If necessary, each of wires 30 and 32 can be coated with an electrically non-conductive coating (if the fluent dielectric material in which a frame element is immersed is electrically conductive) and/or a coating that is non-absorptive and inert with respect to the particular environment in which frame element 10 is immersed.

Figure 6A:
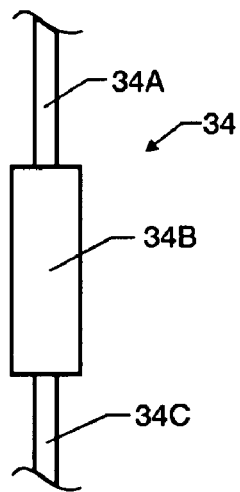
FIG. 6A illustrates a wire-plate combination for an electrically-conductive element used in the present invention.
Figure 6B:
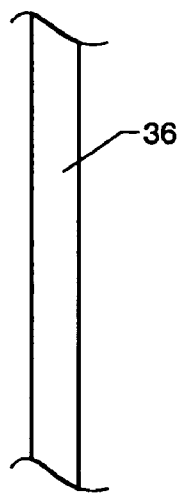
FIG. 6B illustrates an electrically-conductive strip for use as the electrically-conductive element in the present invention.

The electrically-conductive elements supported by a frame element of the present invention are not limited to single coated or uncoated wires. For example, FIG. 6A illustrates another embodiment of a suitable electrically-conductive element 34 that has leading and trailing edge wires 34A and 34C, respectively, electrically coupled to either end of an electrically-conductive plate 34B. In this embodiment, the region defined by plate 34B could be positioned along the frame element's opening. FIG. 6B illustrates that each conductive element used in the present invention could also be an electrically-conductive strip 36 that would extend through and link a plurality of the frame elements together. Strip 36 could be a metallic foil or a flex circuit with conductive traces formed thereon. Strip 36 can be electrically insulated or non-insulated in the same fashion as previously described for wires 30 and 32. If using strip 36 for a conductive element, the passages formed through each frame element would be formed as a corresponding slot. Regardless of the size/shape configuration of the electrically-conductive elements, the portions thereof aligned with the opening (e.g., opening 24 in frame element 10) form a capacitive sensor.

Figure 7:
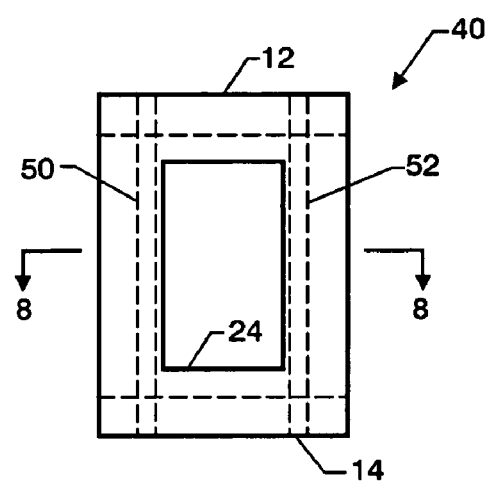
FIG. 7 is a plan view of another embodiment of a single frame element.
Figure 8:
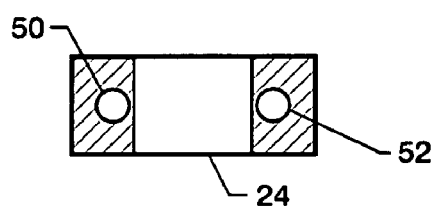
FIG. 8 is a cross-sectional view of the frame element of FIG. 7 taken along line 8—8 thereof.
Figure 9:
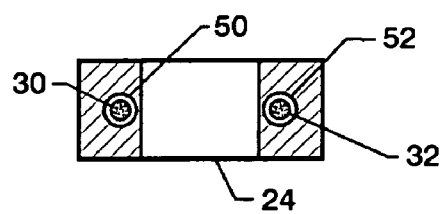
FIG. 9 is a cross-sectional view of the frame element of FIG. 7 taken along line 8—8 thereof with electrically-conductive elements in each of the frame element's passages.

The configuration of the present invention's frame element is not limited to that just described. For example, another frame element embodiment is illustrated in FIGS. 7 and 8 and is referenced generally by numeral 40. The elements that are common to frame elements 10 and 40 are referenced with the same numerals and will not be described further herein. In contrast to frame element 10, frame element 40 has parallel passages 50 and 52 that do not open to opening 24 along the length thereof. Accordingly, as shown in FIG. 9, when wires 30 and 32 extend through frame element 40, wires 30 and 32 are fully encased thereby all along the length of frame element 40. In this embodiment, wires 30 and 32 could be uncoated with the materials of frame element 40 providing the necessary protective features for the electrically-conductive elements.

Figure 10:
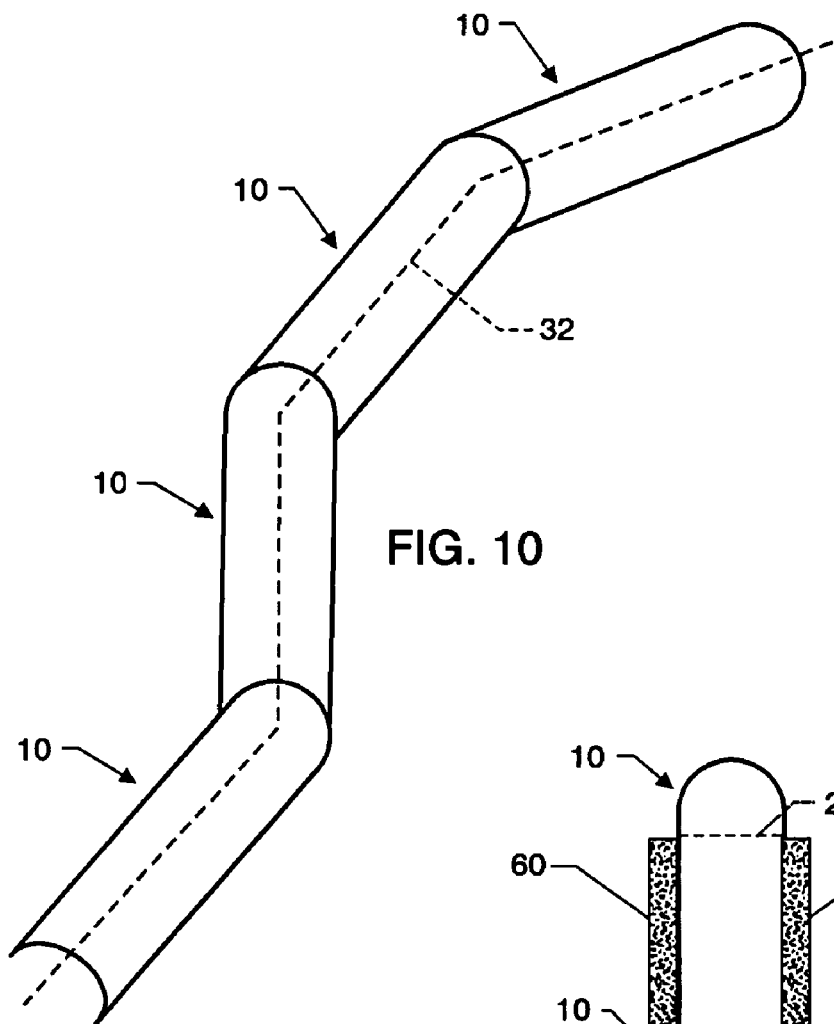
FIG. 10 is a side view of a flexible capacitive sensing arrangement constructed using a number of the frame elements of the present invention.

As mentioned above, a number of the frame elements of the present invention can be arranged in nested end-to-end relationships. Once arranged, the frame elements can be linked or strung together by two spaced-apart, electrically-conductive elements (e.g., wires 30 and 32). Wire crimps (not shown) or other mechanical stops can be used at the first and last frame elements to keep the wires in place and the frame elements in their nested relationships. The independent pivotal movement at each end-to-end interface allows the strung arrangement to readily flex in different directions as shown in FIG. 10 where a number of frame elements 10 are linked by the electrically-conductive elements of which only wire 32 is illustrated.

Figure 11:
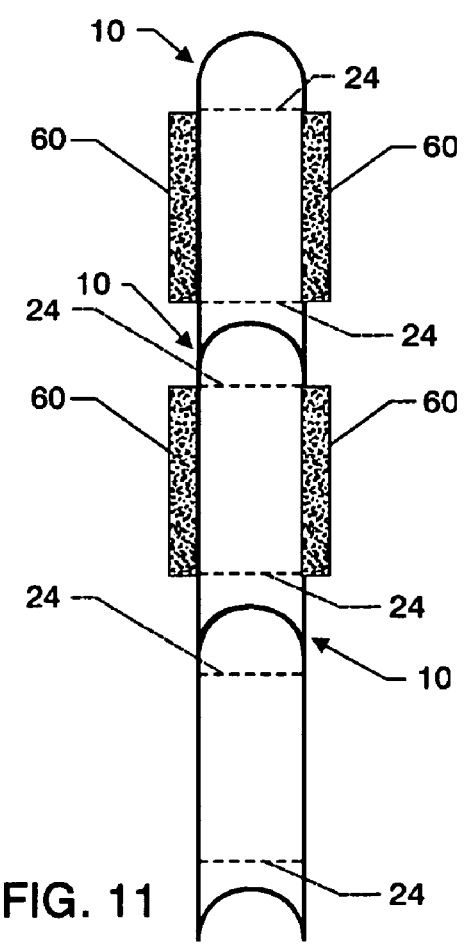
FIG. 11 is a side view of a flexible capacitive sensing probe in accordance with the present invention.

The advantages of the present invention are numerous. The flexible framework provides the support for electrically-conductive elements in a capacitive sensing arrangement. The framework readily flexes in different directions while maintaining fixed spacing between the capacitive sensing elements. Further, the present invention can be used to construct a flexible capacitive sensing probe designed to sense at only specific regions along the length of the flexible capacitive sensing arrangement. For example, FIG. 11 illustrates a side view of strung together frame elements 10 in which blocking plugs 60 are used to plug up selective ones of openings 24 to thereby inhibit sensing capability at the frame element while others of openings 24 remain open.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A flexible framework adapted to support electrically-conductive elements in a capacitive sensing arrangement, comprising:

at least two identical frames, each of said frames defined by a first end that is convexly-shaped along a dimension thereof and a second end opposing said first end that is concavely-shaped along said dimension wherein said first end of one of said frames is nestable with said second end of another of said frames, each of said frames having first and second passages extending therethrough from said first end thereof to said second end thereof wherein, when said first end of one of said frames is nested with said second end of another of said frames, said first passages associated with said frames so-nested are aligned end-to-end and said second passages associated with said frames so-nested are aligned end-to-end, each of said first and second passages adapted to receive an electrically-conductive element therethrough, said first and second passages maintaining a constant spacing between at least a portion of the electrically-conductive element in said first passage and at least a portion of the electrically-conductive element in said second passage along a defined region of each of said frames, and each of said frames having a hollowed-out portion formed in said defined region that is adapted to allow the passage of a fluent material therethrough, said hollowed-out portion being sized and shaped to provide for capacitive sensing along said defined region between the electrically-conductive element in said first passage and the electrically-conductive element in said second passage.

2. A flexible framework as in claim 1 wherein each of said frames fully encases an associated one of the electrically-conductive elements within said first and second passages along said defined region.

3. A flexible framework as in claim 1 wherein each of said frames partially encases an associated one of the electrically-conductive elements within said first and second passages along said defined region.

4. A flexible framework as in claim 1 wherein each of said frames is electrically non-conductive.

5. A flexible framework adapted to support electrically-conductive elements in a capacitive sensing arrangement, comprising:

a plurality of identical frames arranged end-to-end with adjacent ones of said frames capable of rotational movement therebetween about an axis that is common thereto, each of said frames having first and second passages extending therethrough and parallel to one another wherein said first passages associated with said frames so-arranged are aligned end-to-end and said second passages associated with said frames so-arranged are aligned end-to-end, each of said first and second passages adapted to receive an electrically-conductive element therethrough, and each of said frames having a hollowed-out portion adapted to allow the passage of a fluent material therethrough, said hollowed-out portion being sized and shaped to provide for capacitive sensing along a defined region between the electrically-conductive element in said first passage and the electrically-conductive element in said second passage.

6. A flexible framework as in claim 5 wherein each of said frames fully encases an associated one of the electrically-conductive elements within said first and second passages along said defined region.

7. A flexible framework as in claim 5 wherein each of said frames partially encases an associated one of the electrically-conductive elements within said first and second passages along said defined region.

8. A flexible framework as in claim 5 wherein each of said frames is electrically non-conductive.

9. A flexible framework as in claim 5 further comprising means for plugging said hollowed-out portion in at least one of said frames wherein said capacitive sensing along said defined region thereof is inhibited.

10. A flexible capacitive sensing arrangement, comprising:

a plurality of identical frames arranged end-to-end with adjacent ones of said frames capable of rotational movement therebetween about an axis that is common thereto, each of said frames having first and second passages extending therethrough and parallel to one another wherein said first passages associated with said frames so-arranged are aligned end-to-end and said second passages associated with said frames so-arranged are aligned end-to-end, and each of said frames having a hollowed-out portion adapted to allow the passage of a fluent material therethrough at a defined region between said first and second passages;

a first electrically-conductive element extending through said first passages associated with said frames so-arranged;

a second electrically-conductive element extending through said second passages associated with said frames so-arranged; and said hollowed-out portion being sized and shaped to provide for capacitive sensing along said defined region between said first electrically-conductive element and said second electrically-conductive element.

11. A flexible capacitive sensing arrangement as in claim 10 wherein each of said frames fully encases said first and second electrically-conductive elements within said first and second passages, respectively, along said defined region.

12. A flexible capacitive sensing arrangement as in claim 10 wherein each of said frames partially encases said first and second electrically-conductive elements within said first and second passages, respectively, along said defined region.

13. A flexible capacitive sensing arrangement as in claim 10 wherein each of said frames is electrically non-conductive.

14. A flexible capacitive sensing arrangement as in claim 10 further comprising means for plugging said hollowed-out portion in at least one of said frames wherein said capacitive sensing along said defined region thereof is inhibited.

15. A flexible capacitive sensing arrangement as in claim 10 wherein said first electrically-conductive element is encased in an electrically-insulative material.

16. A flexible capacitive sensing arrangement as in claim 10 wherein said first electrically-conductive element is made from a material that is inert with respect to the fluent material passing through said hollowed-out portion.

17. A flexible capacitive sensing arrangement as in claim 10 wherein said second electrically-conductive element is encased in an electrically-insulative material.

18. A flexible capacitive sensing arrangement as in claim 10 wherein said second electrically-conductive element is made from a material that is inert with respect to the fluent material passing through said hollowed-out portion.

19. A flexible capacitive sensing arrangement as in claim 10 wherein each of said frames is defined by a first end that is convexly-shaped and a second end opposing said first end that is concavely-shaped, wherein said first end of one of said frames is nestable with said second end of another of said frames.

* * * * *